US007610128B2

(12) United States Patent
O'Connor et al.

(10) Patent No.: US 7,610,128 B2
(45) Date of Patent: Oct. 27, 2009

(54) SECURELY CALCULATING AND STORING VEHICLE ODOMETER DATA

(75) Inventors: Ian David O'Connor, Seattle, WA (US); Martin Jay Caspe-Detzer, Fall City, WA (US); Ted Joseph Scherzinger, Sammamish, WA (US); William Michael Creel, Federal Way, WA (US); Wayne Michael Winch, Stanwood, WA (US)

(73) Assignee: PACCAR Inc, Bellevue, WA (US)

( * ) Notice: Subject to any disclaimer, the term of this patent is extended or adjusted under 35 U.S.C. 154(b) by 0 days.

(21) Appl. No.: 11/752,882

(22) Filed: May 23, 2007

(65) Prior Publication Data

US 2008/0294312 A1 Nov. 27, 2008

(51) Int. Cl.
*G06F 19/00* (2006.01)

(52) U.S. Cl. ......................... 701/35; 235/95 R; 235/96; 702/97; 702/105

(58) Field of Classification Search ....................... None
See application file for complete search history.

(56) References Cited

U.S. PATENT DOCUMENTS 4,258,421 A * 3/1981 Juhasz et al. .................. 701/35
5,924,057 A * 7/1999 Kell ........................... 702/165
6,519,516 B2 * 2/2003 Pfaeffle et al. ................ 701/35
6,856,933 B1 * 2/2005 Callaghan ................... 702/149
2003/0055599 A1 * 3/2003 Ohle et al. .................. 702/158
2004/0078124 A1 * 4/2004 Schauble ..................... 701/29
2005/0015186 A1 * 1/2005 Kelly et al. ................... 701/29
2007/0168125 A1 * 7/2007 Petrik ......................... 701/213

OTHER PUBLICATIONS http://www.benzworld.org/forums/w163-m-class/1319230-odometer-reset.html.*
http://m3forum.net/m3forum/showthread.php?t=30946.*

* cited by examiner

*Primary Examiner*—Khoi Tran
*Assistant Examiner*—Nicholas Kiswanto
(74) *Attorney, Agent, or Firm*—Christensen O'Connor Johnson Kindness PLLC

(57) ABSTRACT

Aspects of the present invention are directed at securely calculating and storing odometer data associated with a vehicle. In accordance with one embodiment, a method is provided that checks the integrity of odometer data being received from a vehicle's engine. More specifically, the method includes receiving a first and second engine odometer values for an engine. Then, these odometer values are compared to determine whether data indicative of tampering was received. In this regard, if data indicative of tampering was received, aspects of the present invention adjust the official vehicle odometer value to account for the tampering.

11 Claims, 4 Drawing Sheets

SECURELY CALCULATING AND STORING VEHICLE ODOMETER DATA

FIELD OF THE INVENTION

The invention relates to systems for maintaining accurate information about the attributes of a vehicle.

BACKGROUND

Increasingly, electronic components are being relied upon to facilitate the operations of a vehicle. These electronic components aid in the development of sophisticated vehicle subsystems such as collision detection systems, automated cruise control systems, global positioning navigation, and the like. In this regard, systems have been developed that allow electronic components to communicate in accordance with standard protocols. For example, an electronics control unit associated with a vehicle engine that was developed by an engine manufacturer may communicate with a cab-mounted electronic control unit that was developed by a different manufacturer. Since communication protocols have been standardized, components from different manufacturers may be used in the same vehicle.

Development of standardized communication protocols provides an opportunity to automate and/or improve certain vehicle processes. For example, an electronic control unit associated with a vehicle's engine typically manages the amount of fuel input into the engine by a fuel injector. Moreover, the electronic control unit may be configured to identify the distance traveled by a vehicle over a given unit of time. This data may be communicated over a vehicle-wide network to other components in the vehicle such as a cab-mounted electronic control unit. As a result, information about the operation of a vehicle's engine may be made available to a vehicle operator.

A deficiency with existing systems is that odometer data may not be synchronized between different electronic components in the vehicle. For example, an electronic control unit associated with a vehicle's engine may calculate odometer data using a methodology that is different than the methodology that is used by a cab-mounted electronic control unit. While any discrepancy may initially be small, over the lifetime of the vehicle the discrepancy will accumulate and become significant.

Another deficiency with existing systems is that odometer data being received from a vehicle's engine is not necessarily checked for consistency. A common problem in the vehicle industry is the "rollback" of a vehicle's odometer. Traditionally, rollback prevention systems centered on the physical protection of an odometer that used mechanical components in performing calculations. However, electronic components in a vehicle's engine that are now being used to calculate odometer data may also be subject to tampering.

Another deficiency with existing systems is the inability to manage odometer data across multiple engines. Frequently, a seller may make assertions regarding the odometer attributes of the vehicle and one or more engines installed in the vehicle. For example, a vehicle owner may claim that a vehicle has two-hundred thousand (200,000) miles, and that a new engine was installed that was only used for twenty-thousand (20,000) miles. It would be beneficial to have a way to verify the accuracy of these types of assertions.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Aspects of the present invention are directed at securely calculating and storing odometer data associated with a vehicle. In accordance with one embodiment, a method is provided that checks the integrity of odometer data being received from a vehicle's engine. More specifically, the method includes receiving a first and second engine odometer values for an engine. Then, these odometer values are compared to determine whether data indicative of tampering was received. In this regard, if data indicative of tampering was received, aspects of the present invention adjust the official vehicle odometer value to account for the tampering.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Although the present invention will be described primarily in the context of an application for securely calculating and storing vehicle odometer data, those skilled in the art and others will appreciate that the invention is also applicable in other contexts. In any event, the following description first provides a general overview of a system architecture of electronic components that may be used to implement aspects of the present invention. Then, an exemplary method for calculating and storing vehicle odometer data will be described. The examples provided herein are not intended to be exhaustive or to limit the invention to the precise forms disclosed. Similarly, any steps described herein may be interchangeable with any other steps or combinations of steps in order to achieve the same results. Accordingly, the embodiments of the present invention described below should be construed as illustrative in nature, and not limiting.

Figure 1A:
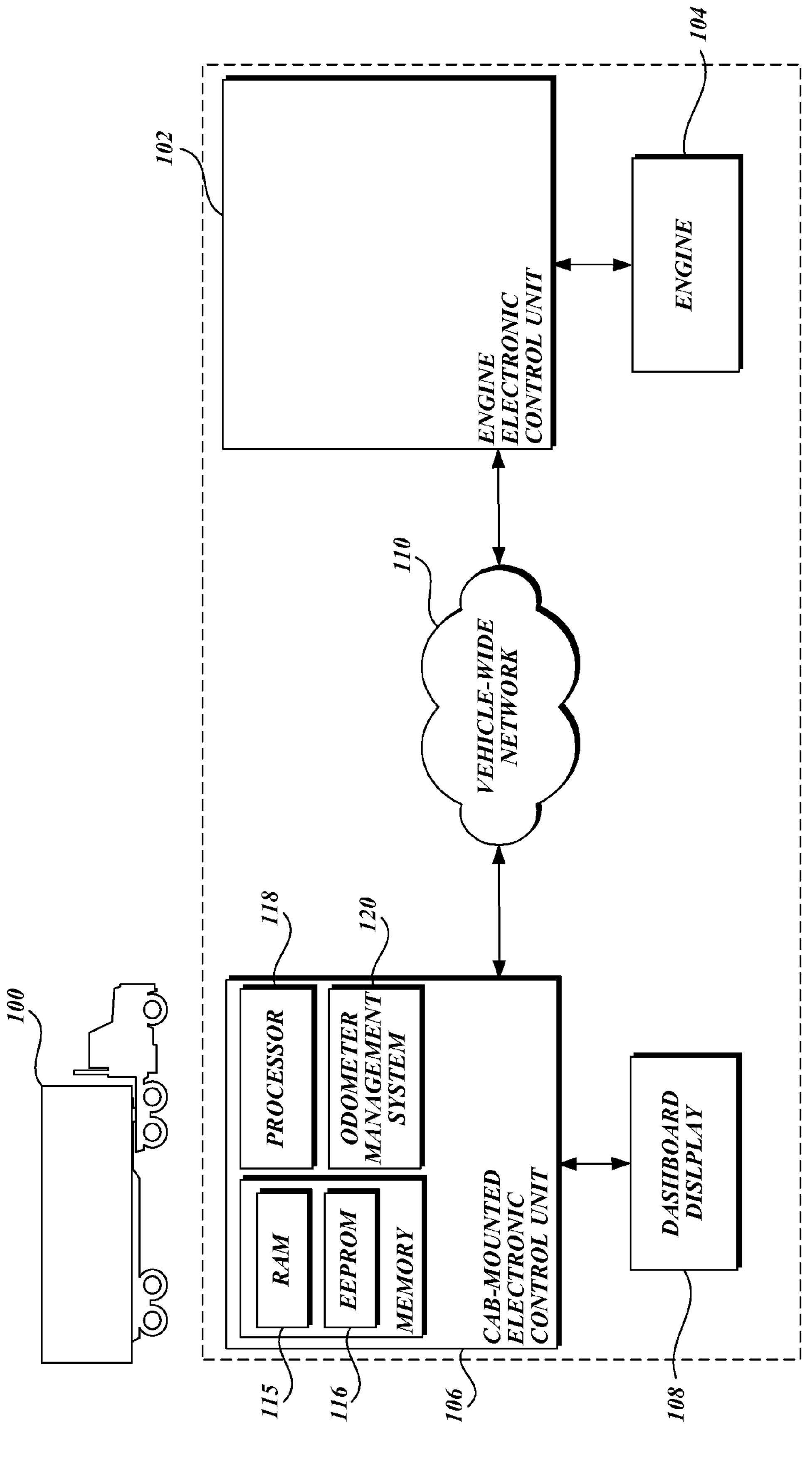
FIG. 1A is a pictorial depiction of an exemplary system architecture that illustrates electronic components suitable for implementing aspects of the present invention.

FIG. 1A and the following discussion is intended to provide a brief, general description of an electronic system architecture in a truck 100 that is suitable to implement aspects of the present invention. As illustrated in FIG. 1A, the system architecture in the truck 100 includes an engine control unit 102 that is associated with an engine 104. Moreover, the truck 100 also includes a cab-mounted electronics control unit 106 that is associated with a dashboard display 108 for presenting odometer data to a vehicle operator. One of ordinary skill in the art will appreciate that the system architecture of the truck 100 will include many more components than those depicted in FIG. 1A. However, it is not necessary that all of these generally conventional components be shown or described in order to disclose an illustrative embodiment for practicing the present invention.

As further illustrated in FIG. 1A, the electronic control units 102 and 106 are communicatively connected via the vehicle-wide network 110. Those skilled in the art and others will recognize that the vehicle-wide network 110 may be implemented using any number of different communication protocols such as, but not limited to, Society of Automotive Engineer's ("SAE") J1708, SAE J1587, or SAE J1939. However, the invention may be implemented in other types of currently existing on yet to be developed in-vehicle communication systems without departing from the scope of the claimed subject matter.

The system architecture for the truck 100 depicted in FIG. 1A includes the electronic control unit 102 for managing various aspects of the engine's 104 operation. The electronic control unit 102 may use one or more sensors to monitor and control the operation of the engine 104. For example, the engine's 104 ignition timing, fuel consumption, and the like, may be monitored by the electronic control unit 102. With regard to the present invention, the electronic control unit 102 regularly calculates a set of odometer data during operation of the truck 100. In this regard, the electronic control unit 102 may be configured to obtain input from sensors when calculating the engine odometer data. Moreover, the odometer data may be communicated to other electronic components in the truck 100 via the vehicle-wide network 110. For example, engine odometer data calculated by the electronic control unit 102 may be transmitted via the vehicle-wide network 110 to the cab-mounted electronic control unit 106.

In the illustrative embodiment depicted in FIG. 1A, the truck 100 includes a cab-mounted electronic control unit 106. Generally described, the cab-mounted electronic control unit 106 manages the interface between the vehicle operator and various vehicle systems. In this regard, the cab-mounted electronic control unit 106 may communicate with other electronic components of the truck 100 over the vehicle-wide network 110. Data collected from the various components may be processed by and presented to a vehicle operator. For example, data received from various electronic components associated with vehicle subsystems (collision detection, engine operation, cruise control, and the like) may be received and processed by the cab-mounted electronic control unit 106 so that data that describes the operation of the truck 100 may be presented on the dashboard display 108.

As further illustrated in FIG. 1A, the cab-mounted electronic control unit 106 includes a memory 114 with a Random Access Memory ("RAM") 115, and a Electronically Erasable, Programmable, Read-only Memory ("EEPROM") 116, a processor 118, and an odometer management system 120. Those skilled in the art and others will recognize that the RAM 115 is a volatile form of memory that stores program instructions that are readily accessible by the processor 118. Typically, a fetch and execute cycle in which instructions are sequentially "fetched" from the RAM 115 and executed by the processor 118 is performed. In this regard, the processor 118 is configured to operate in accordance with computer program instructions that are sequentially fetched from the RAM 115.

Aspects of the present invention may be implemented in the odometer management system 120. Those skilled in the art and others will recognize that program code embodying the odometer management system 120 may be loaded into RAM 115 and executed by the processor 118. In one embodiment, odometer data calculated by the odometer management system 120 is regularly saved to the EEPROM 116. In this regard, the EEPROM 116 is a non-volatile memory capable of storing data when a vehicle is not operating. Accordingly, odometer data calculated by the odometer management system 120 is committed for storage on the EEPROM 116 at regularly occurring intervals or when operation of the vehicle terminates. Also, at vehicle start-up, odometer data may be retrieved from the EEPROM 116 by the odometer management system 120 so that the odometer data may be updated while the vehicle is operating.

In some existing systems, the calculation of a vehicle's official odometer value relied on a total engine odometer value that was maintained in memory of the electronic control unit 102. Unfortunately, the electronic control unit 102 may implement few security measures and transmit engine odometer data on a public vehicle network. As a result, a user could "rollback" an official vehicle odometer value by leveraging the lack of security in data maintained in the electronic control unit 102. Generally described, the odometer management system 120 is responsible for calculating and maintaining odometer data in a way that is secure from tampering. In this regard, insecure data that is committed to storage on the electronic control unit 102 is not relied on when updating a vehicle's official odometer value. Instead, the vehicle's official odometer value is calculated based on incremental distance information that is periodically received while the vehicle is operating. Moreover, a check may be performed by the odometer management system 120 to verify the integrity of the data that is received from electronic control unit 102. In instances when the integrity of the data is not verified, the odometer management system 120 performs processing to account for any attempted tampering.

As will be appreciated by those skilled in the art and others, FIG. 1A provides a simplified example of one system architecture for implementing the present invention. In other embodiments, the functions and features of the truck 100 may be implemented using different components. For example, while FIG. 1A depicts a cab-mounted electronic control unit 106 that uses an EEPROM 116 for non-volatile memory storage, those skilled in the art and others will recognize that other types of memory may be used. Thus, FIG. 1A depicts one component architecture for implementing the invention. However, those skilled in the art and others will recognize that other component architectures are possible without departing the scope of the claimed subject matter.

Figure 1B:
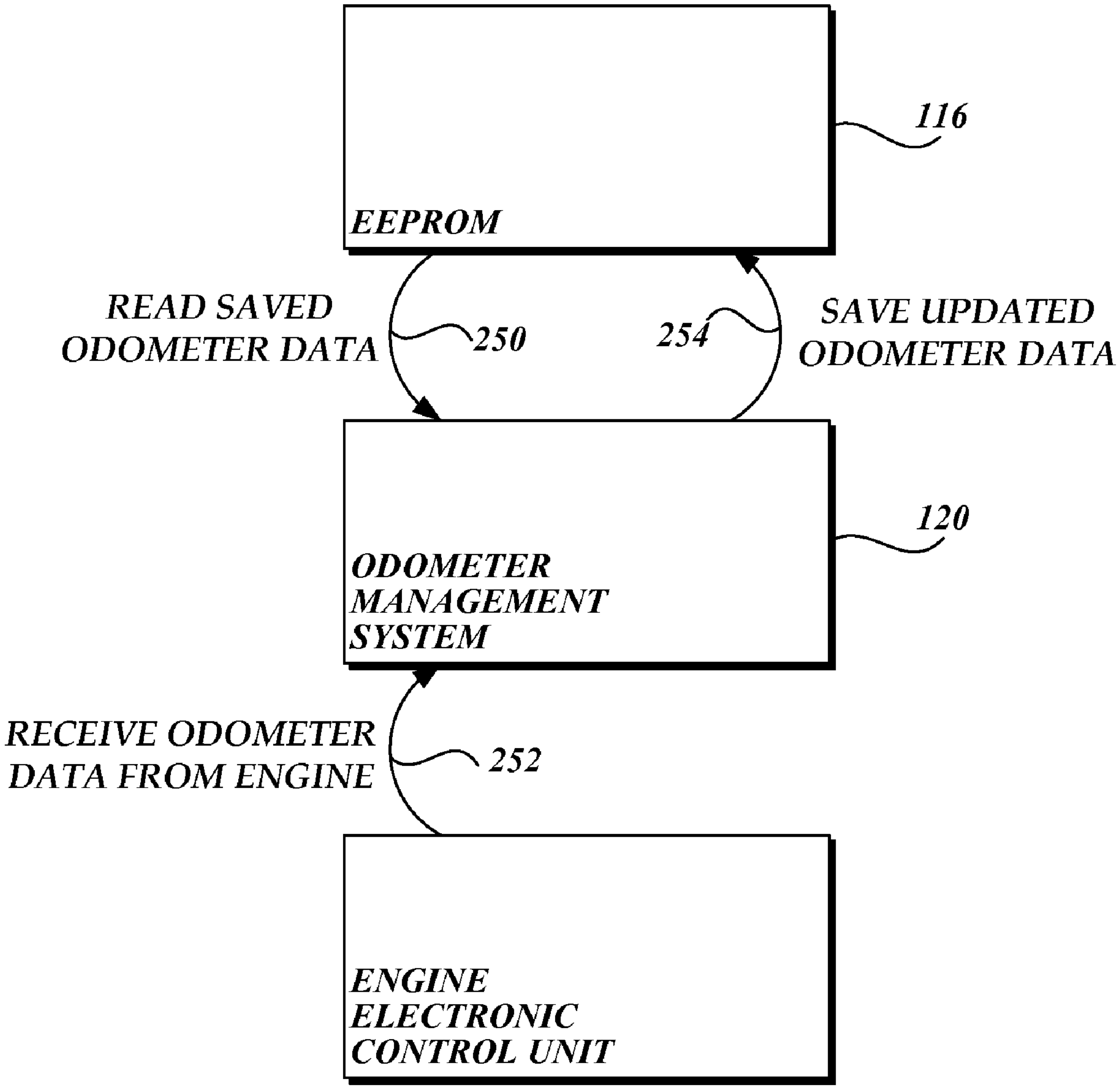
FIG. 1B illustrates interactions between components of the system depicted in FIG. 1A in accordance with one embodiment of the present invention.

With reference now to FIG. 1B, interactions between various components of the truck 100 depicted in FIG. 1A for securely calculating and storing odometer data will be described. At event 250, a set of odometer data previously saved to non-volatile memory in a cab-mounted electronic control unit 106 is "read" from the EEPROM 116. In this regard, the set of data includes the official vehicle odometer value that represents the total distance traveled by the vehicle. In response, the odometer management system 120 creates local variables that correspond to the odometer data read from the EEPROM 116. During operation of the vehicle, a set of odometer data originating from the electronic control unit 102 that represents incremental distance traveled is periodically reported to the odometer management system 120. For example, as depicted in FIG. 1B, a set of odometer data is transmitted from the electronic control unit 102 to the odometer management system 120, at event 252.

When odometer data is received from the electronic control unit 102, the odometer management system 120 updates local variables to reflect movement of the truck 100. In this regard, odometer data as updated by the odometer management system 120 is periodically saved to non-volatile memory. For example, as depicted in FIG. 1B, odometer data that was updated by the odometer management system 120 to reflect movement of the truck 100 is "written" back to the EEPROM 116, at event 254. In this way, aspects of the invention obtain, update, and save odometer data to reflect movement of the truck 100.

Now, with reference to FIG. 2, an activation method 200 that may be implemented by the odometer management system 120 to obtain data from non-volatile memory event will be described. Those skilled in the art and others will recognize that non-volatile memory, such as the EEPROM 116 (FIG. 1A), may store odometer data even though a vehicle is not operating. When an activation event occurs, previously saved odometer data is read from non-volatile memory so that the data may be updated to reflect ongoing operations of the vehicle.

Figure 2:
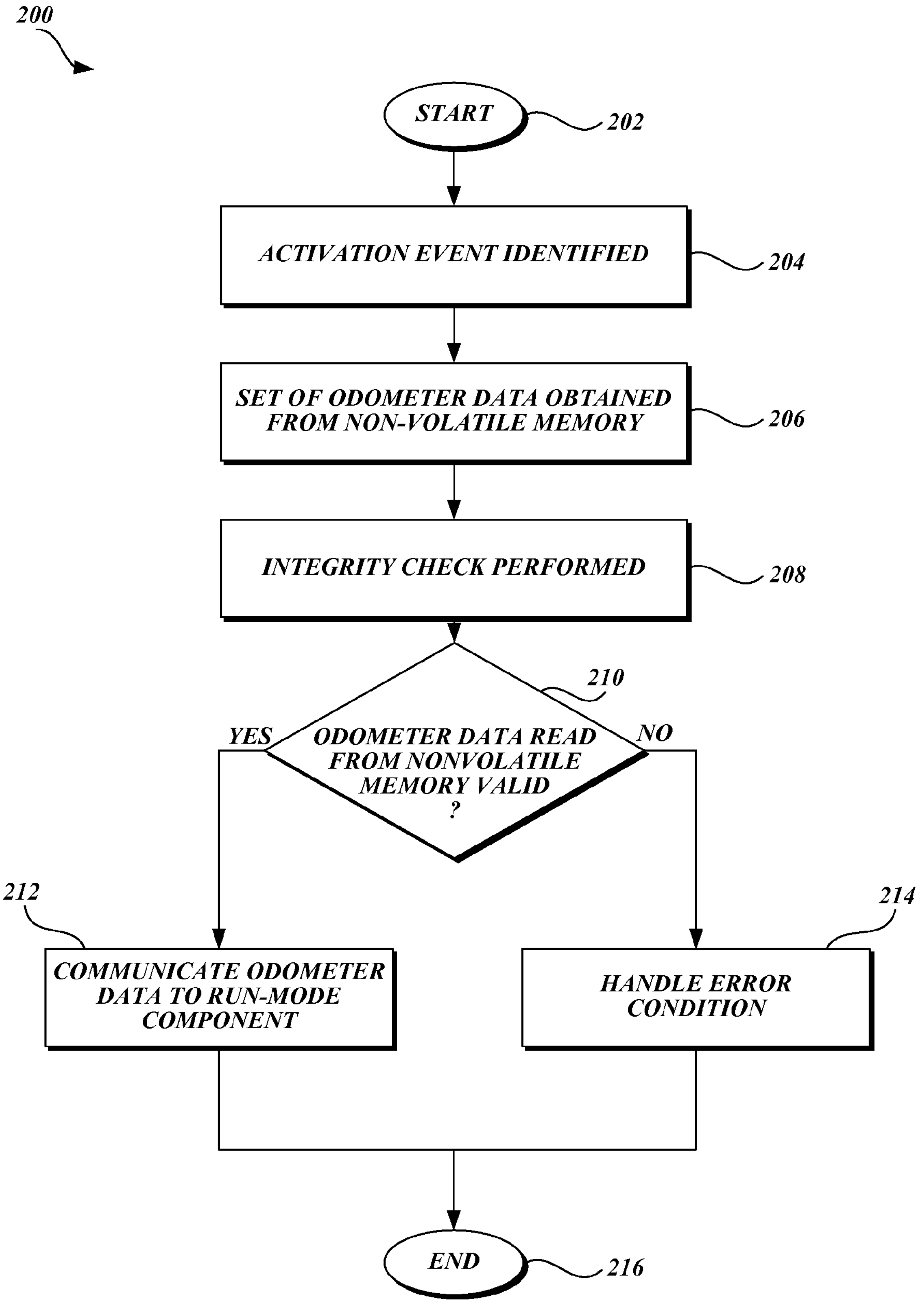
FIG. 2 is an exemplary flow diagram of a method for accessing vehicle odometer data in accordance with another embodiment of the present invention.

As illustrated in FIG. 2, the activation method 200 begins at block 202, and at block 204, an activation event is identified. Generally described, an activation event occurs when a vehicle's odometer data will be updated to reflect use of the vehicle. By way of example only, the activation event identified at block 204 may be the ignition of the vehicle's engine. Also, electronic components in a vehicle may be put to "sleep" when a predetermined period of inactivity is identified. Thus, the activation event identified at block 204 may include other types of events, such as the return from a reduced processing state.

Once an activation event occurs, a set of odometer data stored on non-volatile memory is obtained, at block 206. As described in further detail below, aspects of the present invention perform processing to securely update a vehicle's odometer. In one embodiment, a set of odometer data is regularly saved to non-volatile memory. For example, before operation of a vehicle terminates, an updated set of odometer data that reflects usage of the vehicle may saved to non-volatile memory (e.g., the EEPROM 116). In this regard, the set of odometer data obtained from non-volatile memory, at block 206, may include: (1) an official vehicle odometer value; (2) an official engine odometer value; (3) an engine offset; and (4) a negative rollback offset. In this regard, the official vehicle odometer value represents the total distance traveled in the vehicle's lifetime. Similarly, the engine odometer value represents the total distance traveled while the current engine has been installed in the vehicle. The engine offset represents the total distance traveled with one or more previously installed engines other than the current engine. As described in further detail below, the engine offset may be used when calculating the official vehicle odometer value. Finally, the negative rollback offset quantifies the extent in which a user attempted to "rollback" an engine odometer value as reported from a vehicle's engine.

At block 208, an integrity check is performed to determine whether the official vehicle odometer value and engine offset value retrieved from non-volatile memory, at block 206, are valid. In one embodiment, a "checksum" is used to determine if this data retrieved from non-volatile memory is valid. In this regard, a checksum records basic information that describes attributes of a set of odometer data when saved. For example, the basic information may be the number of bytes in the set of odometer data that is saved to non-volatile memory. When the odometer data is retrieved from memory, a check may be performed to determine whether the number of bytes saved and retrieved from memory are the same. Then, at decision block 210, a determination is made regarding whether the official odometer value and engine offset value are valid. In instances when the checksum performed at block 208 indicates that the set of odometer data retrieved from non-volatile memory is not valid, the activation method 200 proceeds to block 214, described in further detail below. Conversely, if the checksum indicates that the odometer data is valid, the activation method 200 proceeds to block 212.

At block 212, the official vehicle odometer value that was read from non-volatile memory is communicated to a run-mode component of the odometer management system 120. As described in further detail below with reference to FIG. 3, the run-mode component is responsible for updating odometer data while the vehicle is operating.

At block 214, the activation method 200 handles the error condition that was identified at block 210. In handling the error condition, the activation method 200 may display information to the vehicle operator indicating that an error has occurred. Moreover, a description of the error condition may be recorded in a log file for subsequent retrieval. In this regard, the information inserted into the log file may include an error code identifying the type of error that was encountered. Then, the activation method 200 proceeds to block 216, where it terminates.

Now with reference to FIG. 3, a calculation method 300 that updates a vehicle's odometer on behalf of a run-mode component of the odometer management 120 will be described. The calculation method 300 periodically receives a set of odometer data that originates from a vehicle's engine. When received, a comparison is performed to determine whether the received odometer data that originated from the vehicle's engine is inconsistent with previously received odometer data. In this regard, the calculation method 300 performs processing to account for any attempted tampering of the received odometer data. Also, instances when a different engine has been installed in the vehicle are identified and accounted for in managing a vehicle's odometer. Then, the calculation method 300 updates the vehicle's official odometer value to reflect ongoing operation of the vehicle. In this regard, the official odometer value updated by the calculation method 300 may be periodically saved back to non-volatile memory to prevent the loss of data.

Figure 3:
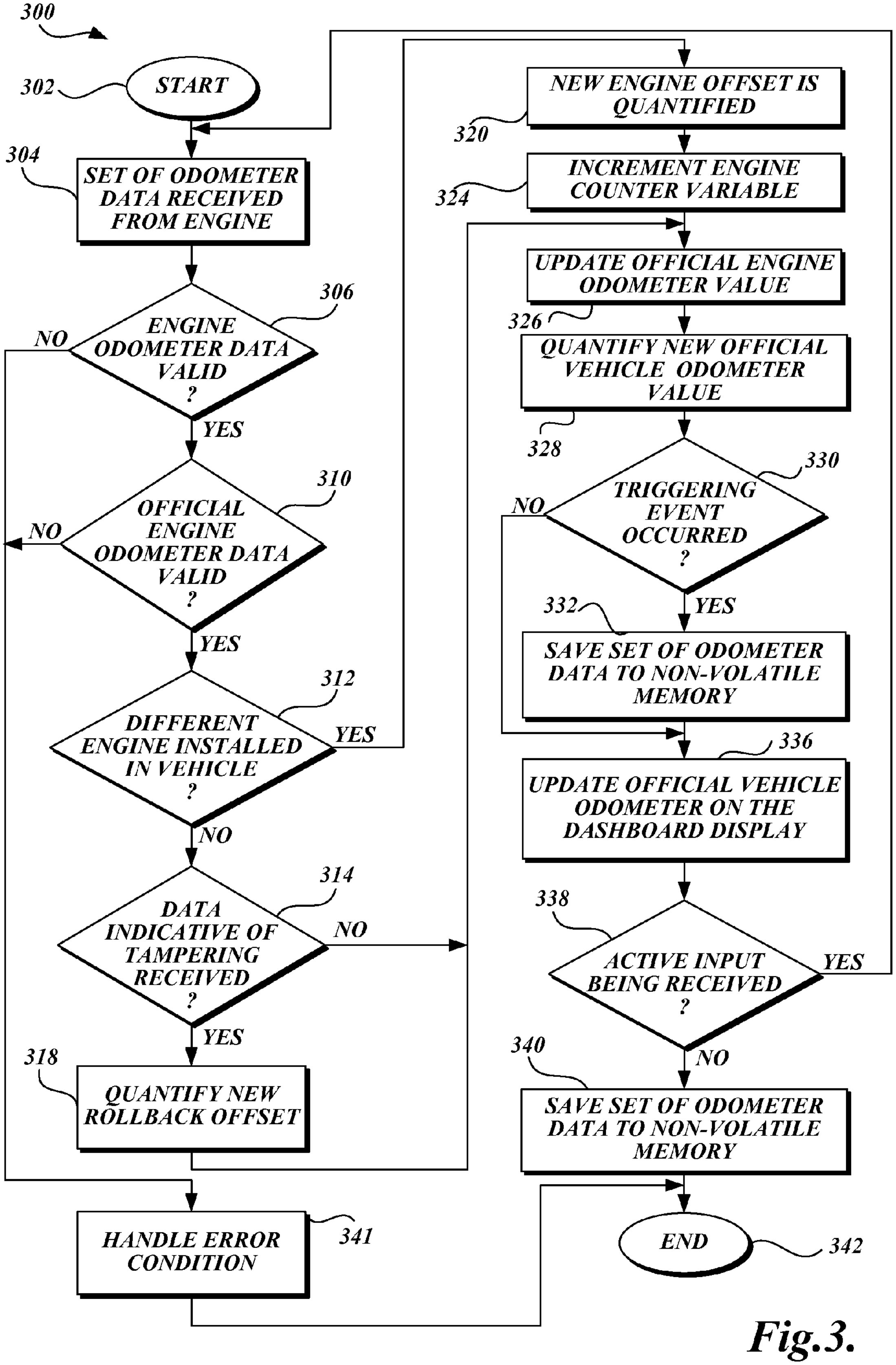
FIG. 3 is an exemplary flow diagram of a method that updates an official vehicle odometer value in accordance with another embodiment of the present invention.

As illustrated in FIG. 3, the calculation method 300 begins at block 302, and at block 304, a set of odometer data that originates from a vehicle's engine is received. In one embodiment, the set of odometer data may be periodically transmitted from the electronic control unit 102 over the network 110. As mentioned previously, few security measures are implemented to protect the integrity of odometer data that is stored in memory of the electronic control unit 102. Thus, as described further below, aspects of the present invention may check the validity of the received data to determine whether attempted tampering with the engine odometer data is occurring. In any event, the odometer data transmitted over the network 110 is received at the cab-mounted electronic control unit 106 where the data is available to the calculation method 300. In accordance with one embodiment, the engine odometer data is received at regularly scheduled intervals. By comparing engine odometer data received at different intervals, incremental distance information of the distance traveled over a given period of time is readily identifiable.

At decision block 306, a test is performed to determine whether the odometer data received at block 304 is valid. In some instances, data may be corrupted when transmitted over a vehicle network. For example, electronic components may malfunction so that data received at the cab-mounted electronic control unit 106 is not valid. Thus, aspects of the present invention check the validity of the odometer data that is periodically received from the vehicle's engine before performing updates. For example, the test performed at decision block 306 ensures that the data received hasn't reported a vehicle velocity that is not capable of being achieved. In any event, if the test performed at decision block 306 indicates that the odometer data received from a vehicle's engine is invalid, the calculation method 300 proceeds to block 341, described in further detail below. Conversely, if the set of odometer data is identified as being valid, the calculation routine 300 proceeds to block 310.

At decision block 310, a determination is made regarding whether the official engine odometer value retrieved from non-volatile memory by the activation method 200 (FIG. 2) is valid. Similar to the description provided above with reference to FIG. 2, the official engine odometer value may be validated using a checksum integrity check. If the results of the checksum indicate that the official engine odometer value that was retrieved from non-volatile memory is not valid, then the calculation routine 300 proceeds to block 341, described in further detail below. Conversely, if the checksum indicates that official engine odometer value is valid, the calculation method 300 proceeds to block 312.

As illustrated in FIG. 3, at block 312, a determination is made regarding whether a different engine has been installed in the vehicle. If block 312 is reached, engine odometer data originating from different sources is available for comparison. More specifically, an official engine odometer value was that was retrieved from non-volatile memory in a cab-mounted electronic control unit 106 may be compared with an engine odometer value that originated from the vehicle's engine. Determining whether a different engine has been installed in the vehicle may be performed by comparing these values. In this regard, a test is conducted to determine whether the difference between the official engine odometer value and the engine odometer value as reported from the vehicle's engine is greater than two-hundred kilometers (200 kms). If the difference is greater than 200 kilometers, then a different engine has been installed in the vehicle. In this instance, when the result of the test performed a block 312 is "YES," the calculation method 300 proceeds to block 320. Conversely, if the result of the test is "NO," then the calculation method 300 proceeds to block 314.

At decision block 314, a determination is made regarding whether inconsistent odometer data indicative of tampering has been reported from a vehicle's engine. As mentioned previously, odometer data that originates from the electronic control unit 102 is periodically reported over a network to the cab-mounted electronic control unit 106. To determine whether attempted tampering is occurring, a comparison is performed between successive engine odometer values as reported from the electronic control unit 102. An electronic control unit 102 associated with a vehicle's engine 104 that has not been tampered with will report increasing engine odometer values. Thus, if the engine odometer value received at block 304 is less than an engine odometer value that was previously received from the same engine 104, this is indicative of tampering and the calculation method proceeds to block 318. Conversely, if the test performed at block 314 indicates that the engine odometer values as reported by the vehicle's engine are increasing, then the calculation method 300 proceeds to block 326.

At block 318, a new negative rollback offset is quantified. In accordance with one embodiment, the new rollback offset quantified at block 318 is the square of the difference between successive engine odometer values received from a vehicle's engine, summed with any previously quantified rollback offset. As described in further detail below, the negative rollback offset that is updated each time an attempted tampering occurs may be used to modify the official vehicle and engine odometer values to account for the attempted tampering of engine odometer data. Then the calculation method 300 proceeds to block 326, described in further detail below.

As further illustrated in FIG. 3, at block 320, a new engine offset is quantified. If block 320 is reached, the calculation method 300 determined that a different engine has been installed in the vehicle. In order to maintain the official vehicle odometer value, an engine offset value that represents the total distance traveled using one or more previously installed engines other than the current engine is maintained. In this regard, if the current engine is the first engine installed in the vehicle, the engine offset maintained by the present invention will equal "0" and the official vehicle and engine odometer values will be the same. However, in instances when multiple engines have been installed in a vehicle, the engine offset represents the total distance traveled by one or more previously installed engines other than the current engine. For example, if the current engine is the third to be installed, the engine offset represents the total distance traveled using the first two engines. Thus, the new engine offset calculated, at block 320, is the official engine odometer value for the previously installed engine minus the engine odometer value of the current engine, summed with the previous engine offset. By updating the engine offset in this way, a vehicle's engine may be reprogrammed or replaced without compromising the official vehicle odometer value. Once the engine offset is quantified, at block 320, it is saved to non-volatile memory in the cab-mounted electronic control unit 106.

At block 324, the calculation method 300 increments a variable that represents the total number of engines that have been installed in the vehicle ("engine counter"). Some manufacturers or end users may have prohibitions or limitations on the number of engines that may be installed. Thus, aspects of the present invention maintain an engine counter so that this characteristic of the vehicle may be readily identified.

At block 326, the official engine odometer value maintained by the odometer management system 120 is updated. More specifically, the engine odometer value received on a previous iteration of the calculation method 300 is set to equal the new engine odometer value that was received at block 304. Before block 326 is reached, data that accounts for the possibility of tampering and/or a new engine being installed has been identified. Thus, the official engine odometer value maintained by the odometer management system 120 may be updated to equal the new engine odometer value received at block 304. As a result of performing an update in this way, the official engine odometer values maintained by the odometer management system 120 is synchronized with an engine odometer value received from a vehicle's engine.

At block 328, the calculation method 300 quantifies a new official odometer value for the vehicle. In one embodiment, the official odometer value quantified at block 328 equals the summation of (1) the official engine odometer value (updated at block 326), (2) the engine offset, (3) and the negative rollback offset. As described previously, the engine odometer value represents the total distance traveled using the current engine and the engine offset represents the total distance traveled using any previously installed engines. Summation of these values with the negative rollback offset that accounts for tampering with data received from the engine produces a total distance traveled by the vehicle.

At decision block 330, a determination is made regarding whether a triggering event occurred that will cause a set of odometer data updated by the calculation method 300 to be saved back to non-volatile memory. In one embodiment, the calculation method 300 periodically saves a set of odometer data back to non-volatile memory (e.g., the EEPROM 116) each time the vehicle travels a predetermined distance (e.g., 100 kilometers). However, this example is merely exemplary as the calculation method 300 may be configured to save the set of odometer data more or less frequently without departing from the scope of the claimed subject matter. If the vehicle has not traveled the predetermined distance and the threshold has not been satisfied, the calculation method 300 proceeds to block 336, described below. Conversely, if a triggering event was identified, the calculation method 300 proceeds to block 332.

As illustrated in FIG. 3, a set of updated odometer data is saved to non-volatile memory, at block 332. The set of odometer data saved to non-volatile memory at block 332 includes the official odometer value updated at block 328, the official engine odometer value updated at block 326, and the negative rollback offset that may have been updated if attempted tampering was identified. By periodically saving this set of odometer data back to non-volatile memory, aspects of the present invention ensure that an error does not result in excess data loss.

At block 336, the calculation method 300 causes the official vehicle odometer value that is currently displayed on a dashboard display to be updated. In this regard, the official vehicle odometer value currently displayed to a vehicle operator is "refreshed" based on the update to the vehicle's official odometer value. However, since refreshing the information presented on a dashboard display may be performed using techniques that are generally known in the art, these techniques will not be described here.

At decision block 338, a determination is made regarding whether active input of odometer data is being received from a vehicle's engine. Active input may not be received when operation of the vehicle stops or the vehicle remains idle for a predetermined amount of time. If active input is being received, the calculation method 300 proceeds back to block 304 and blocks 304-338 repeat until input is no longer being received. Conversely, if active input is not being received from the vehicle's engine, the calculation method 300 proceeds to block 340.

At block 340 a set of odometer data is saved to non-volatile memory since active input is no longer being received from a vehicle's engine. The set of odometer data saved to non-volatile memory, at block 332, includes the official odometer value updated at block 328, the official engine odometer value updated at block 326, and the negative rollback offset. Then, the calculation method 300 proceeds to block 342, where it terminates.

At block 341, the calculation method 300 handles an error condition. In handling the error condition, the calculation method 300 may display information to the vehicle operator indicating that an error has occurred. Moreover, a description of the error condition may be recorded in a log file for subsequent retrieval. In this regard, the information inserted into the log file may include an error code identifying the type of error that was encountered. Then, the calculation method 300 proceeds to block 342, where it terminates.

While illustrative embodiments have been illustrated and described, it will be appreciated that various changes can be made therein without departing from the spirit and scope of the invention.

The embodiments of the invention in which an exclusive property or privilege is claimed are defined as follows:

1. In a vehicle that includes a current engine, a first electronic control unit associated with the current engine, and a second electronic control unit that is communicatively connected to the first electronic control unit, a method of calculating an official vehicle odometer value that represents a total distance traveled by the vehicle, the method comprising:

maintaining a current engine offset in a memory of the second electronic control unit, wherein the current engine offset represents the total distance traveled by the vehicle calculated as a sum of one or more previous engine offsets and a difference between an official engine odometer value of the one or more previous engines and an engine odometer value of the current engine;

receiving the engine odometer value from the first electronic control unit, wherein the engine odometer value represents the total distance traveled by the vehicle using the current engine; and calculating an official vehicle odometer value to determine if the engine odometer value is tampered, wherein the official vehicle odometer value is based on a summation of the engine odometer value received from the first electronic control unit and the current engine offset maintained in the memory of the second electronic control unit.

2. The method as recited in claim 1, further comprising causing the official odometer value to be presented on a dashboard display.

3. The method as recited in claim 1, further comprising causing the official odometer value to be periodically saved to non-volatile memory upon the identification of a triggering event.

4. The method as recited in claim 1, wherein calculation of the official vehicle odometer value does not depend on data that is maintained in memory of the first electronic control unit.

5. The method as recited in claim 4, wherein the first electronic control unit may be reprogrammed without changing the official vehicle odometer value maintained by the second electronic control unit.

6. The method as recited in claim 1, wherein maintaining the engine offset, includes:

identifying a change in engines installed in the vehicle; and if a change in engines was identified, adding the official engine odometer value associated with the one or more previously installed engines to the engine offset.

7. The method as recited in claim 6, wherein identifying a change in engines includes incrementing an engine counter that tracks the total number of engines installed in the vehicle.

8. The method as recited in claim 1, wherein calculating an official vehicle odometer value, includes:

performing a comparison between successive engine odometer values as reported from the first electronic control unit; and determining whether the comparison indicates that data indicative of tampering was received.

9. The method as recited in claim 8, further comprising if data indicative of tampering was received, adjusting the official vehicle odometer value to account for the tampering.

10. The method as recited in claim 1, wherein calculating an official vehicle odometer value includes synchronizing an official engine odometer value maintained in the second electronic control unit with the engine odometer value received from the first electronic control unit.

11. The method as recited in claim 1, wherein the engine odometer value is periodically received during operations of the vehicle from the first electronic control unit and the calculation of the official vehicle odometer value is based on the periodically received engine odometer value.

* * * * *